United States Patent Office 2,994,611
Patented Aug. 1, 1961

2,994,611
HARDENING OF PROTEIN
Johannes Heyna, Ludwig Wilhelm Berlin, and Erich Schinzel, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 13, 1959, Ser. No. 799,106
Claims priority, application Germany Mar. 19, 1958
6 Claims. (Cl. 96—111)

A hardening of proteins, especially of glue and gelatin, is effected in known manner in such a way that the respective hardener enables the combination of several molecules of the protein to form larger complexes by chemical linkage by means of reactive groups so that a cross-linking of protein molecules takes place. The cross-linking of protein molecules implies an increase of the melting point and of the mechanical stability of the swelled glue or gelatin layers. In addition, a decrease of their swelling capacity in aqueous solutions is observed.

From German Patent 872,153 it is known to use divinyl sulfone as hardener for photographic glue and gelatin layers. However, this simple compound cannot be used in practice owing to its detrimental physiological properties shown by this simplest divinyl sulfone.

Now it has been found that an excellent hardening of proteins, particularly of photographic glue and gelatin layers, is achieved by adding to the protein-containing mixtures such as emulsions or colloidal solutions aromatic compounds containing at least two vinyl-sulfonyl groups —SO$_2$—CH=CH$_2$ in the molecule. As compounds containing aromatic vinyl-sulfonyl groups there may especially be mentioned compounds of the general formula

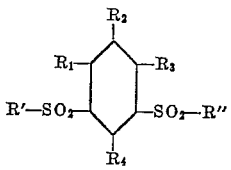

in which R' and R" represent a vinyl group —CH=CH$_2$ or a vinyl-sulfonyl-anilide radical of the formula

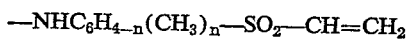

in which $n$ means 0 or an integer from 1–4, and R$_1$, R$_2$, R$_3$ and R$_4$ represent a hydrogen atom, a methyl or ethyl group. There may be mentioned:

1,3-di-(vinyl-sulfonyl)-benzene
1-methyl-2,4-di-(vinyl-sulfonyl)-benzene
1-methyl-3,5-di-(vinyl-sulfonyl)-benzene
1,3-dimethyl-4,6-di-(vinyl-sulfonyl)-benzene
1,3,5-trimethyl-2,4-di-(vinyl-sulfonyl)-benzene
1,3,5,6-tetramethyl-2,4-di-(vinyl-sulfonyl)-benzene
1,3,5-tri-(vinyl-sulfonyl)-benzene
1-methyl-2,4,6-tri-(vinyl-sulfonyl)-benzene
Benzene-1,3-disulfonic acid-di-(4'-vinyl-sulfonyl)-anilide
Benzene-1,3-disulfonic acid-di-(3'-vinyl-sulfonyl)-anilide
1,3 - dimethyl - benzene - 4.6 - disulfonic acid - di - (4'- vinyl-sulfonyl)-anilide
1,3 - dimethyl - benzene - 4,6 - disulfonic acid - di - (3'- vinyl-sulfonyl)-anilide.

These aryl-vinylsulfones can for example be prepared according to German Patent 842,198. Aryl-β-oxy-ethyl-sulfones are transformed in the presence or absence of indifferent solvents into their sulfuric acid esters which, when treated with alkalies, yield the desired aryl-vinyl-sulfones. A further method of preparation is disclosed by German Patent 877,607. According to this method the aryl-vinyl-sulfones are obtained by splitting off hydrogen halide from aryl-β-halogen-ethyl-sulfones with dilute alkalies in aqueous suspension. The said aromatic disulfonic acid-di-(vinyl-sulfonyl)-anilides can, for example, be prepared by reacting the corresponding sulfo chlorides with the sulfuric acid esters of amino-aryl-β-oxy-ethyl-sulfones in aqueous suspension in the presence of chalk and by subsequent treatment with alkali.

The hardeners of the present invention are applied in the same manner as the hardeners hitherto used. The quantities to be used may vary within wide limits. Generally, there are applied quantities ranging between about 0.3 to 1.5 g./liter, preferably between about 0.5 to 1.0 g./liter.

In practical use the new hardeners show the advantage that their physiological properties are completely harmless.

Owing to the presence of at least two radicals activated by adjacent sulfonyl groups the compounds of the present invention can combine with the reactive groups of the proteins and thus effect cross-linking.

The technical advance of the described new hardeners becomes evident particularly in the case of photographic silver-halide gelatin layers. Formalin that is often used in practice for the hardening of silver-halide gelatin emulsions is unsuitable at pH-values of 7 and above since it has highly reducing effect in this pH-range and can produce fogs.

In contradistinction thereto, the aromatic polyvinyl-sulfonyl compounds may be used with particular advantage in the neutral range, especially at pH-values of about 6–7. According to the quantity used, the new hardeners produce in a very short time a rise of the melting point of the gelatin to 90° C. or 100° C. In addition, they show the advantage that they do not intensify the formation of fogs.

A further advantage of the hardeners of the invention, particularly of the compounds possessing a vinyl-sulfonyl-anilide radical, consists in their application for the preparation of enlargement papers with emulsions of silver chloride and silver bromide. Hereby, there is achieved a brown coloration generally desired in practice as cannot be obtained by means of other hardeners hitherto used.

In contradistinction to the divinyl-sulfone disclosed in German Patent 872,153 as hardener for photographic glue and gelatin layers, the aromatic poly-(vinyl-sulfonyl) compounds are distinguished by the fact that they are completely harmless in their physiological properties and thus may be used in practice without any risk.

The superiority of these new hardeners consists also in the fact that they reduce the sensitiveness of the photographic silver-halide gelatin layers far less than the customary hardeners.

As a further favorable property of the new hardeners it must be mentioned that the viscosity of their emulsions does not increase on standing which is often the case with other hardeners.

The use of the new hardeners proves to be of particular advantage in the hardening of modern photographic multilayered color material for chromogenic development, the individual layers of which containing the color-forming components. In this case, formalin has proved to be completely unsuitable for the hardening of the silver-halide gelatin layers since it reacts with the various color components, leads to yellow and other colored fogs and sometimes produces variations of the tint. The salts of the trivalent chromium are just as unsuitable in this case because, when using them, no pure white tint can be obtained in the hardened component-containing layers.

The aromatic poly-(vinyl-sulfonyl) compounds of the present invention can be used as hardeners either per se or in combination with other hardeners.

The following examples serve to illustrate the invention but they are not intended to limit it thereto:

Example 1

To 1 liter of a customary silver chloride- or bromide-gelatin emulsion showing a pH-value of 6–7 there are added 0.8 gram of 1,3-di-methyl-4,6-di-(vinyl-sulfonyl)-benzene dissolved in 10 cc. of methanol. This emulsion is poured in known manner on plates, films or photographic papers. After a short storage there is obtained an emulsion layer having a melting point of between 90° C. and 100° C.

Example 2

13 cc. of a solution of 4 grams of 1,3-dimethyl-benzene-4,6-disulfonic acid-di-(4'-vinyl-sulfonyl)-anilide in 50 cc. of water and 15 cc. of a 2 N-solution of sodium hydroxide are added to 1 liter of a customary silver chloride-bromide-gelatin emulsion. The emulsion which shows a pH-value of 6–7 is poured in known manner on photographic papers. After a short time of storage there is obtained an emulsion layer whose melting point is little below 100° C. The photographic papers obtained in this way yield a generally desired brown tint. Instead of the 1,3-dimethyl-benzene-4,6-disulfonic acid-di-(4'-vinyl-sulfonyl)-anilide there can likewise be used with the same success the 1,3-dimethyl-benzene-4,6-disulfonic acid-di-(3'-vinyl-sulfonyl)-anilide.

We claim:

1. Photographic gelatine containing silver halide and hardened by the addition thereto of a substituted benzene compound having 2 to 3 vinyl sulfonyl groups ($-SO_2CH=CH_2$) substituted on the benzene nucleus in o-position relative to each other.

2. Photographic gelatine as in claim 1, hardened at a pH of 6–7.

3. Photographic gelatine as in claim 1, hardened with 1,3-dimethyl-4,6-di-(vinylsulfonyl)-benzene.

4. Photographic gelatine as in claim 1, hardened with 1,3 - dimethyl-benzene-4,6-disulfonic acid-di-(4'-vinyl-sulfonyl)-anilide.

5. Photographic gelatine as in claim 1, hardened with 1,3-dimethyl-benzene-4,6-disulfonic acid-di-(3'-vinyl-sulfonyl)-halide.

6. Photographic gelatine containing silver-halide and hardened by the addition thereto of a compound of the formula

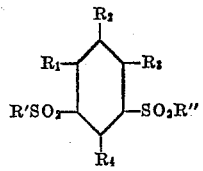

wherein R' and R'' are members selected from the group consisting of vinyl ($-CH=CH_2$), and vinyl sulfonyl anilide ($-NHC_6H_4SO_2CH=CH_2$);

$R_1$, $R_3$, and $R_4$ are members selected from the group consisting of hydrogen, methyl, and ethyl; and $R_2$ is a member selected from the group consisting of hydrogen, methyl, ethyl, and vinyl sulfonyl ($-SO_2CH=CH_2$)

References Cited in the file of this patent

FOREIGN PATENTS

| | | |
|---|---|---|
| 789,947 | France | Nov. 8, 1935 |
| 842,198 | Germany | June 23, 1951 |
| 872,153 | Germany | May 11, 1953 |
| 932,488 | Germany | Sept. 1, 1955 |